United States Patent
Munier et al.

(10) Patent No.: US 10,962,656 B2
(45) Date of Patent: Mar. 30, 2021

(54) METHOD FOR MEASURING AND REPRESENTING THE LEVEL OF LOCAL IRRADIATION DOSES

(71) Applicant: Fibermetrix, Strasbourg (FR)

(72) Inventors: Mèlodie Munier, Strasbourg (FR); Fanny Carbillet, Strasbourg (FR); Ramiro Moreno, Toulouse (FR)

(73) Assignee: Fibermetrix, Strasbourg (FR)

( * ) Notice: Subject to any disclaimer, the term of this patent is extended or adjusted under 35 U.S.C. 154(b) by 2 days.

(21) Appl. No.: 16/489,631

(22) PCT Filed: Feb. 15, 2018

(86) PCT No.: PCT/FR2018/050359
§ 371 (c)(1),
(2) Date: Aug. 28, 2019

(87) PCT Pub. No.: WO2018/158518
PCT Pub. Date: Sep. 7, 2018

(65) Prior Publication Data
US 2020/0025946 A1 Jan. 23, 2020

(30) Foreign Application Priority Data
Mar. 3, 2017 (FR) ...................................... 1751740

(51) Int. Cl.
*G01T 1/02* (2006.01)
*G01T 1/20* (2006.01)

(52) U.S. Cl.
CPC .............. *G01T 1/023* (2013.01); *G01T 1/201* (2013.01)

(58) Field of Classification Search
CPC ........... G01T 1/20; G01T 1/161; G01T 1/023; G01T 1/201
See application file for complete search history.

(56) References Cited

U.S. PATENT DOCUMENTS 6,330,299 B1  12/2001 Curtis et al.
7,228,166 B1 *  6/2007 Kawasaki ............ A61B 5/0073
                                                       600/424
(Continued)

FOREIGN PATENT DOCUMENTS

EP    1581824 A2 * 10/2005 ............. G01T 1/201
WO    2003/047694 A2   6/2003

OTHER PUBLICATIONS

Chida et al., Real-Time Patient Radiation Dosimeter for use in Interventional Radiology, Physica Medica, vol. 32, Issue 11, (Nov. 2016), pp. 1475-1478 (abstract only).
(Continued)

*Primary Examiner* — David P Porta
*Assistant Examiner* — Fani Boosalis
(74) *Attorney, Agent, or Firm* — TraskBritt

(57) ABSTRACT

A method for measuring and representing the level of local irradiation doses, in at least two dimensions, comprises: a step of positioning N probes $S_i$ sensitive to irradiating radiation, each corresponding to a local zone $Z_i$ according to a known topology; a step of acquiring, by each of the probes, the level of radiation $IS_i$ detected and periodically recording numerical values $IS_i(t)$; and a step of converting the numerical values $IS_i(t)$ into values $DS_i(t)$ corresponding to the radiation dose applied to each of the Z zones associated with a probe $S_i$, according to a calibration table. The method further comprises, during the measurement sequence, steps of spatial interpolation calculation of at least one estimated irradiation level value $IS_{iv}(t)$ of at least one virtual zone $Z_{iv}$ that is not associated with a probe. A measurement device for implementing this method is also described.

19 Claims, 3 Drawing Sheets

(56) References Cited

U.S. PATENT DOCUMENTS

| | | | |
|---|---|---|---|
| 7,491,942 B2* | 2/2009 | Black | A61N 5/1048 |
| | | | 250/370.07 |
| 9,244,178 B2* | 1/2016 | Jung | G01T 1/2006 |
| 9,480,448 B2 | 11/2016 | Guntzer et al. | |
| 2008/0149835 A1 | 6/2008 | Moritake et al. | |
| 2010/0320819 A1 | 12/2010 | Cohen et al. | |
| 2013/0105692 A1 | 5/2013 | Rink et al. | |

OTHER PUBLICATIONS

International Search Report for International Application PCT/FR2018/050359 dated May 11, 2018, 3 pages.

International Written Opinion for International Application PCT/FR2018/050359 dated May 11, 2018, 6 pages.

Nichikido et al., A Prototype Real-Time Dose Distribution Monitoring System Using Plastic Scintillators Connected to Optical Fiber for Interventional Radiology, 2013 IEEE Nuclear Science Symposium and Medical Imaging Conference, (2013), (abstract only).

Thomas, Duncan C., Measurement Error and Exposure Models, Statistical Methods in Environmental Epidemiology, (Jan. 1, 2009), p. 222.

European Communication pursuant to Article 94(3) EPC for European Application No. 18706826.7, dated Dec. 11, 2020, 11 pages with english translation.

* cited by examiner

METHOD FOR MEASURING AND REPRESENTING THE LEVEL OF LOCAL IRRADIATION DOSES

CROSS-REFERENCE TO RELATED APPLICATIONS

This application is a national phase entry under 35 U.S.C. § 371 of International Patent Application PCT/FR2018/050359, filed Feb. 15, 2018, designating the United States of America and published as International Patent Publication WO 2018/158518 A1 on Sep. 7, 2018, which claims the benefit under Article 8 of the Patent Cooperation Treaty to French Patent Application Serial No. 1751740, filed Mar. 3, 2017.

TECHNICAL FIELD

The present disclosure concerns a method for measuring, in real time, the radiation dose received by a patient, or possibly an object subjected to a flux of ionizing radiation.

BACKGROUND

It is important to know in real time the dose received by a patient during examinations, for example, during interventional radiology procedures, because skin irradiation can cause deterministic effects.

In radiation protection, the absorbed dose, or, more concisely, the dose, is the energy deposited per unit of mass by ionizing radiation. Reference is also made to radiative dose or radioactive dose in nuclear physics.

Knowing the dose makes it possible to quantify the energy deposited in a biological tissue in order to predict the deterministic and stochastic effects of irradiation: cancer care planning in radiotherapy or brachytherapy, prediction of disease risks in the event of accidental or voluntary exposure (radiology), definition of safety standards in the nuclear industry, etc.

Interventional radiology includes all diagnostic and/or therapeutic medical procedures guided by radioscopy, including:
  diagnostic and/or therapeutic invasive radio-guided acts; and
  surgical procedures using ionizing radiation per-operatively.

Digitization, the evolution of implants, the ease of obtaining images, all contribute to the increase in the number of these procedures.

In 2002, more than 70 million radiological procedures were performed in France. 1.5% of these procedures concern interventional radiology but 20% of the total dose is delivered by medical radiology. It should be noted that this is a low hypothesis. On the other hand, some of these procedures deliver doses equivalent to a session of radiotherapy. It is therefore particularly important to know and optimize the doses delivered in interventional radiology.

To strengthen dose control, the International Electrotechnical Commission (IEC) has requested that radiological facilities should display dosimetric data, at the console, for each examination and each sequence of this examination (IEC Standard 60601-2-43:2010 March 2010 "Medical Electrical Equipment—Part 2-43: Specific Requirements for Basic Safety and Essential Performance of X-ray Equipment During Procedures"). This may include the Surface Dose Product (PDS) in interventional radiology.

The absorbed dose can be (more or less precisely) calculated using computer simulation tools. In clinical practice, the most important application of these calculation methods is the optimization of distribution of the dose delivered to the patients during radiotherapy through processing planning systems.

However, in interventional radiology, dose calculations do not have the simplicity of those of conventional radiology, particularly because of the multiplicity of irradiation angles and real-time changes in acquisition parameters during the same examination.

To objectify the irradiation dose in interventional radiology, the following indicators are available:
  The surface dose product (PDS): essential for monitoring the delivered dose. Attention: the ionization chamber that measures and cumulates all of the incidences.
  The scopy time that is also essential, but poorly correlated to the skin dose.
  The number of images (informative but insufficient to monitor the doses delivered).
  Air kerma at the interventional reference point (IRP): installations display an air kerma value (or air dose) at the IRP (often located 15 cm upstream of the isocenter, on the beam axis, i.e., about 60 cm from the tube focus). This value is calculated from the PDS measurement. It does not take into account the contribution of the radiation backscattered to the patient's skin and produced by the patient, the attenuation of the table and the mattress, and cumulates the value of each exposure (graphy and scopy) by considering the beam as fixed throughout the procedure (not/taking into account the different incidences).

The Surface Dose product is equal to the average dose absorbed in air integrated on the surface of the X-ray beam in a plane perpendicular to its axis, in the absence of a medium diffusing through the surface of this section, and is noted D(x, y) so that:

$$PDS = \int_A D(x,y) dx dy$$

If the dose is constant over the entire transverse section of the beam, which is generally accepted, the PDS can be expressed as the product of the dose and the transverse surface S of the beam:

$$PDS = D \cdot S$$

Unit: Gy·m2, mGy·cm2, . . .

This index can be directly measured, in the air or in a phantom, thanks to an ionization chamber of the "transmission chamber" type.

The dosimetry of the beams of particles with no charge (photons or neutrons) is characterized by the great physics called kerma (acronym of Kinetic energy released per unit mass). Kerma can be defined as follows:
  considering an ionizing beam of particles with no charge passing through any medium (air, water, a wall, an organ, etc.); and
  considering a small element of this environment, having the mass dm;
  let $dE_{tr}$ be the energy lost by the beam in this small element of matter (the transfer of energy, in the form of kinetic energy transferred to charged particles in this medium).

The kerma K is then the ratio between the energy transfer in this small element and the mass of this element: $K = dE_{tr}/dm$.

The kerma unit is the gray, noted Gy: 1 Gy=1 J/kg.

Estimating the dose absorbed by the skin is recommended. It is not available during the operation, but can be carried out afterwards. Mapping the dose distribution at the skin level is desirable.

Another solution is to use probes placed on the patient's skin to provide a measurement of irradiation doses by dosimeters having the specificity to directly and locally measure the X-ray dose delivered to the patient during an examination. The dosimeter consists of doped fibers forming a scintillator that produces photons during irradiation with ionizing radiation. It forms a matrix of measuring points organized according to a topology defined by the position of the probes relative to the patient. By default, the probes are placed in predefined locations.

French patent FR2981757 describes the general principle of a method for determining an irradiation dose deposited in a scintillator by ionizing radiation. This method consists in:
  irradiating the scintillator for a predetermined time;
  detecting a moment of scintillator excitation with a first photodetector; then
  detecting a moment of reception of a scintillation photon with a second photodetector, operating in single photon counting mode;
  identifying each sequence consisting of an excitation time detection by the first photodetector, and a reception time detection by the second photodetector at a coincidence event;
  counting the number of coincidental events; and
  obtaining the irradiation dose deposited during the irradiation time as a function of the number of coincidence events counted and a predetermined proportionality factor.

European patent application EP 1581824 describes a method for measuring in real time a dose of radiological radiation absorbed by a region to be inspected subjected to a flow of radiological radiation, including the steps of:
  (a) detecting incident radiation at at least one point in the region to be inspected using at least a first bundle of measuring optical fibers containing at least one fiber placed in the region to be inspected and adapted to generate a light signal when it receives radiological radiation,
  (b) measuring the light signal outside the region to be inspected after transmission along the measuring optical fiber; and
  (c) determining the radiological radiation dose received by the measuring optical fiber from the light signal.

The device used is a piece of equipment for the real-time measurement of a radiological radiation dose absorbed by a region to be inspected subjected to a flux of radiological radiation, comprising:
  a dosimeter comprising at least a first bundle of measuring optical fibers, containing at least one fiber placed in the region to be inspected and adapted to generate a light signal when it receives radiological radiation, in order to detect incident radiation at least one point in the region to be inspected,
  means for measuring the light signal outside the region to be inspected after transmission along the measuring optical fiber; and
  means for determining the radiological radiation dose received by the measuring optical fiber from the light signal.

U.S. Pat. No. 9,480,448 describes an image acquisition system, a patient support table and a computer processor that calculates the angle of a beam of radiation directed at the patient in the angiography imaging procedure with respect to the table.

The method consists in calculating an angle of the table; calculating the intersection of the radiation beam with respect to a two-dimensional grid; calculating the radiation dose applied at the intersection of the radiation beam to each of the predefined areas of the two-dimensional grid; calculating the patient's orientation with respect to the two-dimensional grid of predefined areas; and creating a graphical display illustrating an aggregation of the radiation dose applied to each of the predefined areas of the two-dimensional grid for viewing purposes by a user.

This prior art solution makes it possible to determine the irradiation dose on the patient's skin, calculated from the dose measured on the table according to the arm/table angulation. This dose to the skin depends on the distance, angle, density/nature of the skin and corresponds to the dose measured in air.

U.S. Pat. No. 9,649,079 describes another known example of a system for determining a radiation dose applied to different organs of a subject exposed to diagnostic image acquisition by a scanning imaging device. From a register image, a computer processor makes it possible to calculate a boundary of one end of the exposed subject from the two-dimensional register image; calculate a boundary of a first organ depending on the intensity of the grey scale of the plurality of pixels that include the two-dimensional register image; calculate a boundary of at least one anatomical stage according to a predefined geometric orientation with respect to the boundary of the first organ; and apply predefined auxological criteria to calculate a boundary of a second organ dependent on a predefined geometric orientation with respect to the boundary of the anatomical stage(s); and create a display illustrating the dose measurement applied at the area defined by the boundary of the anatomical stage.

The principle of this known solution is to determine off-field organs according to the organs in the field and according to the knowledge of dimensional ratios between organs.

Chinese Patent 1736333 provides for a CT scanner, including an X-ray gantry supporting an X-ray source located opposite a beam detector assembly. A logical part includes a mechanism for controlling the scanning of the object to generate a first scanned detection image. A first elliptical patient model is generated from the scanned image.

The patient's ellipsoidal model is an approximation of the corresponding diameter for dose calculation and display in relation to the control means.

US Patent Publication No. 2010/0320819 is also known in the state of the art.

1. Nishikido, F., Moritake, T., Ito, H. & Yamaya, T. A prototype real-time dose distribution monitoring system using plastic scintillators connected to optical fiber for interventional radiology. (2013).

2. Chida Phd, K. et al. Real-time patient radiation dosimeter for use in interventional radiology. (2016). doi:10.1016/j.ejmp.2016.10.013

The solutions proposed in the prior art have several drawbacks.

First, the data provided by the prior art solutions lacks the resolution to fully map the irradiation levels of a patient's different body areas, including those areas and organs that are not directly located in the radiation beam exposure area.

Secondly, the solutions of the prior art require additional information that is not easy to collect, or otherwise lack precision.

Thirdly, the solutions known in the art at the present time do not allow the maximum dose delivered to the skin to be determined in real time or to provide 3D measurements or lack precision. This aspect is important in, for example, neuro-intervention where a wide range of angulation may be used.

Some solutions require the use of a very large number of detection fibers, and their integration on the table supporting the patient can be relatively constraining, making the system quite difficult to set up.

BRIEF SUMMARY

In order to remedy these disadvantages, the present disclosure concerns, in its broadest sense, a method for measuring and representing the level of local irradiation doses in at least two dimensions, comprising:
- a step of positioning Nprobes $S_i$, sensitive to irradiating radiation, each corresponding to a local zone $Z_i$ according to a known topology,
- a step of acquiring, by each of the probes, the level of irradiation $IS_i$ detected and periodically recording the numerical values $IS_i(t)$; and
- a step of converting the numerical values $IS_i(t)$ into values $DS_i(t)$ corresponding to the radiation dose applied to each of the zones Z associated with a probe $S_i$, according to a calibration table. The method further comprises, during the measurement sequence, steps of spatial interpolation calculation of at least one estimated irradiation level value $IS_{iv}(t)$ of at least one virtual zone Ziv that is not associated with a probe.

The interpolation function is, for example:
- a barycenter interpolation function; and
- a convolution interpolation function with a model.

According to an alternative solution, the present disclosure also includes steps for calculating at least one estimated irradiation level value $IS_{iv}(t)$, a time interpolation function.

According to another alternative solution, the interpolation function is performed by applying a calculation processing taking into account a representation of human morphology. This representation can be either a generic morphology, or personalized in a semi-generic way, or specific to the patient subjected to the irradiation.

According to a particular embodiment, the interpolation step is carried out by applying a calculation processing taking into account the relative position P(t) of the source, the probes and/or the patient. The relative position of the source with respect to the patient is known, for example, by the position X, Y, Z information of the table and/or the angle position of the tube, or by the data provided by a telemeter, or a video camera or triangulation system.

Advantageously, the spatial interpolation step is carried out by applying a calculation processing taking into account the characteristics C(t) of the installation delivering the irradiation doses (emission, detection, processing and display of the signal such as voltage, power, irradiation width, etc . . . ).

The present disclosure also concerns equipment for measuring and representing local doses of irradiation in at least two dimensions, comprising a plurality of radiation-sensitive probes $S_i$, and a computer controlled by a computer code for carrying out the above-mentioned method.

According to an alternative solution, at least a part of the probes $S_i$ are associated with a radiopaque marker.

According to another alternative solution, each of these radiopaque markers has a distinctive identifier.

Advantageously, the probes $S_i$, are arranged according to a predetermined topology on a three-dimensional support adapted to the morphology of the target [whether human or not] to be irradiated.

The purpose of the present disclosure is to provide more comprehensive patient irradiation data to improve the quality of care through better analysis of each exposure, identification of possible sources of variation, and improved protocols and examinations. The present disclosure also makes it possible to highlight any malfunction or drift of the radiation emitting device in real time.

The present disclosure generally describes a method for real-time cartographic estimation of the doses received during an interventional radiology procedure, combined with a dose measuring device.

The device allows the mapping, in real time, of the doses deposited on the skin, in 3D, in a customized way and for the different fields of interventional radiology (neurology, vascular pathology, thoracic pathology, oncology, gynecology, etc.).

BRIEF DESCRIPTION OF THE DRAWINGS

The characteristics and advantages of the present disclosure will appear upon reading the following description, given only by way of a non-restrictive example while referring to the appended drawings, wherein.

DETAILED DESCRIPTION

Figure 1:
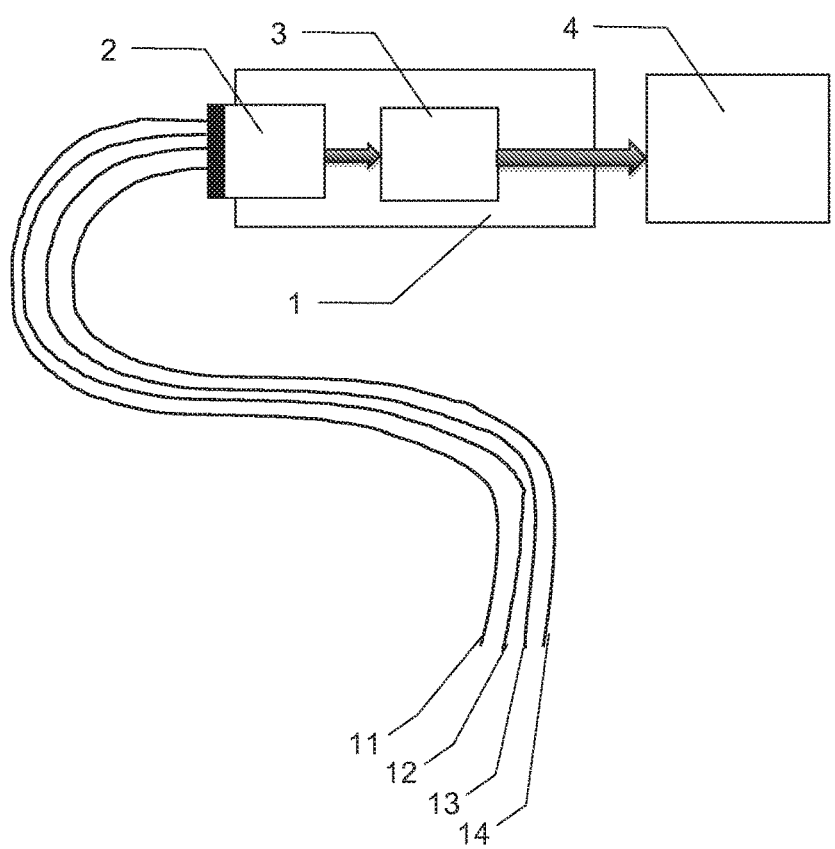
FIG. 1 is a schematic view of a device for determining a dose according to the present disclosure.
Figure 2:
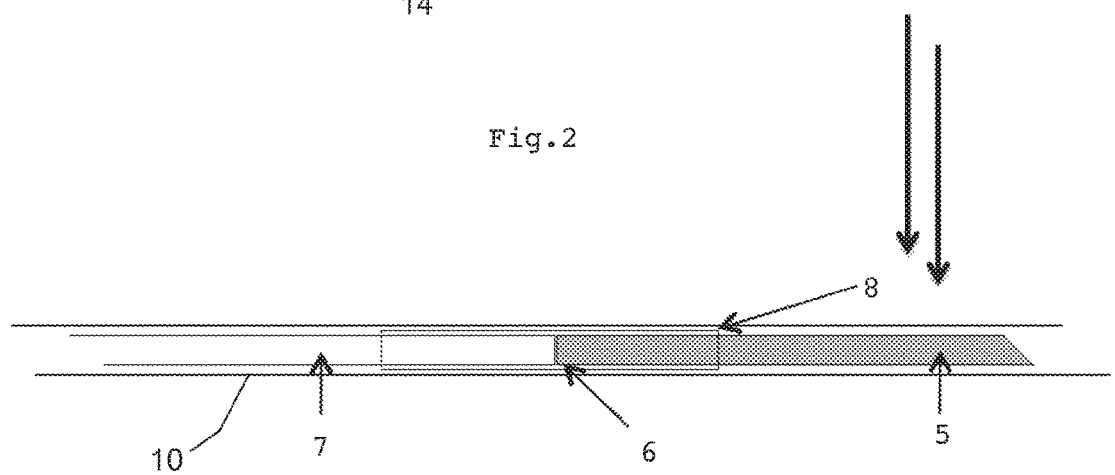
FIG. 2 shows a schematic cross-sectional view of a probe embodying the present disclosure.
Figure 3:
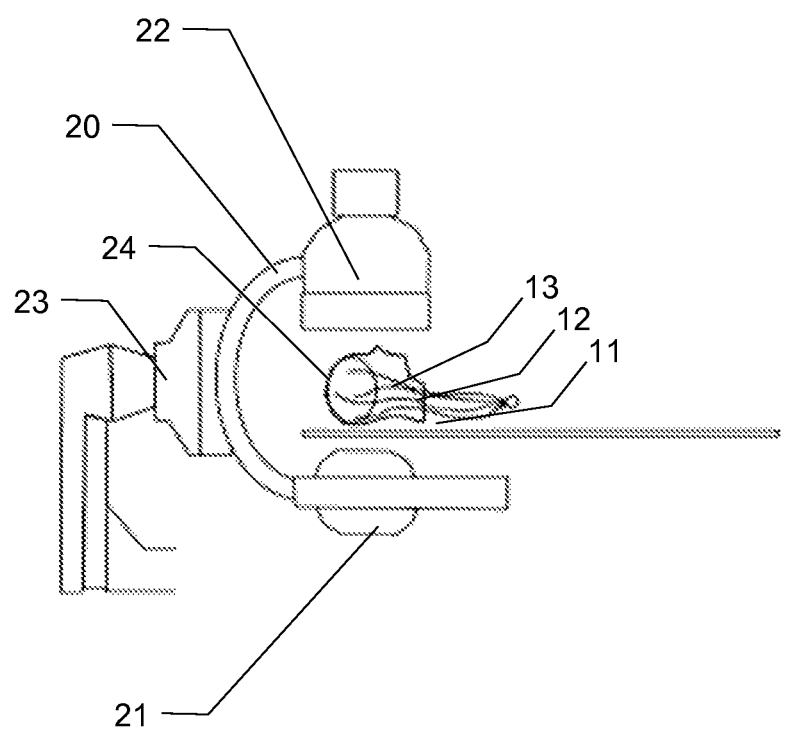
FIG. 3 is a schematic view of neuro-radiology equipment according to the present disclosure.

Due to the plurality of techniques and fields concerned, many risks are inherent in interventional radiology, in particular, the various vigilance measures that include adverse effects of X-rays in the form of significant radiation protection events. Interventional radiology techniques generally involve the following body parts:
- The abdomen (intestine, kidneys, liver, stomach);
- The central nervous system (brain, spinal cord);
- The thoracic cage (breathing system, lungs);
- The cardiovascular system (arteries, veins);
- The musculoskeletal system (bones, joints, spines); and
- The genito-urinary system (reproductive organs, urinary system).

The doses delivered to patients in interventional radiology frequently exceed the value of 200 mGy, i.e., the conventional limit of "low" doses, and often reach a few grays. The possible effects of irradiation are no longer only stochastic in nature and deterministic effects can also be observed (example: radiodermatitis).

Since the dose absorbed by the various organs cannot be measured in real time on patients due to a lack of equipment, the equivalent doses are estimated by measuring the dose on anthropomorphic phantoms or by using software that simulates radiation interactions on mathematical phantoms or on data acquired on the patient. However, the PDS does not accurately reflect the importance of the maximum dose to the skin and its use will only be possible under special and specific conditions of procedures, installation and operators. On the other hand, the relationships between air kerma and PDS are complex and only applicable under specific conditions of realization.

The patient's characteristics (position, thickness, height, weight) are not taken into account, as well as the beam orientation or the physical characteristics thereof (on which the backscatter component is dependent) and/or the actual distances between the source and the patient. In general, the contribution of scopy to the total PDS can be of the order of 30% for diagnostic cardiac procedures and 50% for therapeutic procedures. Even though the recording of the scopy time is accompanied by the number of graphical images and the patient's weight, this evaluation presents a great uncertainty about the actual dose, ranging from +130% to −70%, it being understood that many ionizing radiation (IR) emitting devices do not provide the beam characteristics for each scopy sequence but only an irradiation time and a scopy dose for the entire examination. For example, a dose estimated at 2 Gy could actually have a probable value between 0.6 and 4.6 Gy. During the procedure, the exposure level must be known at all times and the operator must be notified when alert thresholds are reached.

The practice of interventional radiology is confronted with the revelation of numerous irradiation accidents leading to improved consideration of dose management. Many procedures are likely to induce skin lesions and the incidence of deterministic effects increases with the patient's weight, the nature and complexity of the procedure and the previous exposures. Depending on the procedures, scopy times can be particularly long, which means that all the doses cover the entire range of possible skin lesions, from erythema to skin necrosis. Diagnosing these lesions can be difficult, especially when the exposure is unknown to the clinician. It appears that these are often located on the back, the scalp and the breast.

Description of the Equipment

The dose measuring equipment includes a known beam of detector probes 11 to 14 based on the scintillator/optical fiber technology. These probes 11 to 14 are connected to a detection system 1 comprising at least one photodetector 2 and an electronic circuit 3 exploiting the signals delivered by the photodetector 2 into digital information exploited by a computer 4 executing a computer code for processing this information.

During an interventional radiology procedure, probes 11 to 14 are subjected to X-rays, under the action of which the scintillating optical fiber 5 then emits a quantity of light directly proportional to the dose received.

This light is then collected and sent to one or more photodetector(s) 2. The light signal is converted into an electrical signal and then processed by an electronic circuit 3 to give the final dose rate delivered by the ionizing radiation emitting apparatus.

Detail of the Realization of the Probes

The probes 11 to 14 are composed of at least one organic or inorganic scintillating optical fiber 5 sensitive to radiation and connected at one end 6 to one end of a non-scintillating plastic or silica optical fiber 7 by a connecting sleeve 8. The non-scintillating optical fiber 7 is used to convey the light produced in the scintillating part.

The sleeve 8 providing the mechanical resistance can be placed inside or outside a sheath 10. It allows the mechanical reinforcement of the bonding between the non-scintillating optical fiber 7 and the scintillating optical fiber 5, which constitutes a frangible area.

The other end of the non-scintillating optical fiber 7 is equipped with a connection system allowing the optimal connection to a cell of a photodetector 2.

To respect the radiotransparency of the probes 11 to 14, they have a maximum diameter of 1 mm in diameter and opaque sheaths with a maximum thickness of 1 mm. For example, in the case of a tube type sheath, the wall thickness of the sheath is 250 µm.

To ensure the punctuality of the scintillating optical fiber 5, the sleeve 8 and the glue are chosen so as to produce a minimum of parasitic light when they are irradiated and to limit the emission of parasitic light from plastics and solvents under irradiation. To further reduce this interference, the sleeve 8 is of the minimum size required to perform its mechanical reinforcement function. Similarly, the amount of glue used is reduced to a minimum.

This is all the more important as the scintillating optical fiber 5 is small, for example, 3 to 5 mm long.

Detection System

The probes 11 to 14 are connected to a photomultiplier or photodetector 2 via a connector, for example, a "cookie" type connector (architecture of the connector developed by the CNRS free of charge) or, for a single-channel probe, a SMA-905 type connector.

The photodetector 2 consists, for example, of a Hamamatsu H10721-110 or 210 (non-commercial) or multi-anode Hamamatsu H8804, H12700 sensor, etc.

It can also be made up of:
photodiode (SiPM), Avalanche Photodiode (APD), Multi-Pixel Photon Counter (MPPC);
charge-coupled photodetector (CCD sensors); and
or any other device performing the same function.

Electronic Part

Generally speaking, at the output of the photodetector 2, the electrical signal is processed by an electronic circuit 3, initially by a discriminator via an adjustable threshold and makes it possible to determine the counting rate (number of events/photon per time unit) and, in particular, to select the signals generated in the photodetector corresponding to 1 photon, 2 photons, . . . , n photons.

The material part to perform this operation can take two forms:
it can be based on an ASIC technique. In this case it is possible to use, for example a detection board Maroc3 (trade name) developed by the Weeroc company. This board makes it possible to process in parallel the analog signals at the output of the Hamamatsu Multianode PMs (64 channels). The main purpose of the Maroc3 board is to measure the charge and not the photon count. Nevertheless, it could be used in photon counting after modification of the FPGA internal program; and
it can also be based on a discrete electronic circuit. A board has been developed by us and its architecture is similar to the one developed for the product dedicated to scanning, with the difference that it integrates an FPGA allowing parallel multi-channel processing. The developed board can contain from 1 to n channels (n being the number of channels of the photodetector 2 used), connected to at least one photodetector.

These circuits allow the parallel acquisition of signals from one or more single photodetector(s) or one or more multi-channel photodetector(s) simultaneously. These circuits are designed in such a way that detection thresholds (as well as gain values) can be defined for each channel. This makes it possible to correct fluctuations due to the photodetectors or the different electronic channels.

The electronic circuit 3 receives a signal at the output of the photodetector 2 via a resistance bridge ensuring polarization at a voltage of 2.5V. Then, a comparator is used to select according to a predefined voltage level and transform the analog signal into a TTL digital signal. The latter is either sent directly to a counter in an FPGA or formatted (generation of a monostable) before being counted.

Data is then transmitted to a control and display device via a wired connection, for example, via a flash drive or Ethernet or wirelessly, for example, via Wifi or Bluetooth.

A remote or not remote screen, placed, for example, on the visualization screens in the operation room, allows the real-time visualization of the cumulative doses and/or the instantaneous dose received by the patient. Data can be transferred to this screen via wired network or wireless connection as before.

The photodetector 2, the electronic circuit 3 and the computer 4 are housed in a housing located outside the radiation field so as not to interfere with the X-ray flux. In particular, it can be positioned at the end of the table so as not to disturb the patient or the radio manipulator and/or the doctor interacting with the patient and can be operated on batteries.

Application to Neuro-Radiology

Interventional radiology is used in different fields of medicine. Examples include neuro-radiology and interventional cardio-radiology. Dosimetric probes must then respond to the different needs and constraints inherent to each domain. Their geometry will therefore be different, for example, depending on whether they are to be used in neuro-radiology or cardio-radiology.

For skull procedures (neuro-radiology), radiology equipment consists of a rotating head 20 that can be moved around the patient's head in a known manner, whereby an X-ray source 21 and an X-ray unit 22 are fixed diametrically opposite each other. A positioning arm 23 immobilizes the patient's head in a reproducible manner.

The probe can be placed according to a predetermined topology or not on a three-dimensional support adapted to the morphology of the target presented, for example, in the form of a cap 24 that can be integrated into the headrest or placed directly on the patient's skull. This cap is used as a support for the positioning of the end of one or more probe(s) 11 to 13 connected either to a multi-channel photodetector (preferably a PMT) or to several photodetectors (preferably PMTs) if, for example, the number of fibers is not very large.

Other Applications

Figure 4:
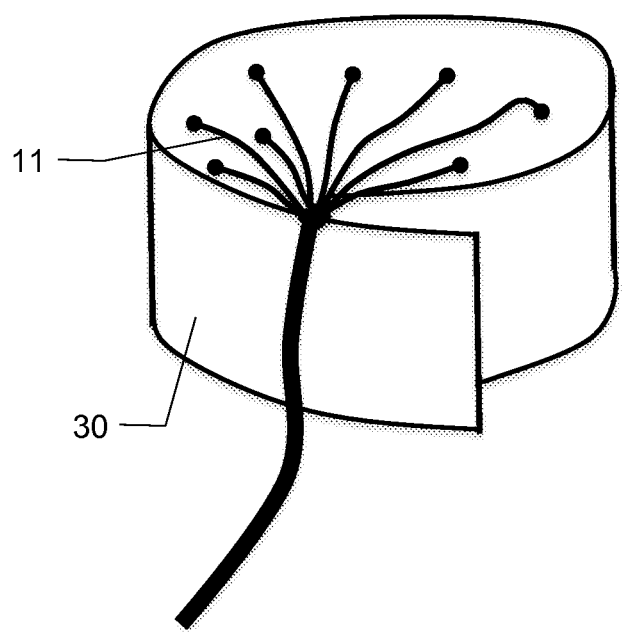
FIG. 4 is a schematic view of a piece of equipment, in the form of a belt, according to the present disclosure.

For procedures at the thorax or on the abdo-pelvic area, the three-dimensional support can be in the form of a belt 30 as illustrated in FIG. 4 and can also support several probes 11 homogeneously distributed (constant area spacing) or not according to the areas of interest.

Software Processing

The software part makes it possible to visualize in real time (less than a second with data refreshing every 500 ms, for example) the dose deposited on the patient's skin with a spatial resolution depending on the area of interest and the number of sensors.

The computer program also allows dose deposits to be mapped using 3D reconstruction/modelling of the patient, for example, from images of the patient, data relating to the dose deposited during the interventional procedure (patient images, mapping from DACS or manufacturers, dicom sr, other real-time manufacturer data, or Gafchromic® type detectors) and the dose measured for the various points of interest by the probes 11 to 14.

The DICOM data is defined by a standard for the computer management of data from medical imaging. This standard defines an organized structure of a series of fields and the image pixels that correspond to a particular field.

Each field is defined by:
a) for explicit encodings:
  a label (tag);
  a value representation (VR—Value Representation) encoded by two characters;
  the value length; and
  value.
(b) for implicit encodings:
  a label (tag);
  the value length; and
  value.
    A label consists of:
      a group number encoded by two bytes; and
      an element number encoded by two bytes.

The DICOM data relating to the dose deposited and the machine characteristics is accessible in real and/or delayed time when the radiological installations allow it.

For example, the patient's modelling will be based on a scanographic examination performed prior to the operation.

The dose mapping can be represented by a color code. Alert thresholds, defined above, are used to report exceedances of the maximum skin dose (hot spot).

This solution is designed in such a way that it can be combined with a software program for calculating the dose distribution. This allows:
  to optimize such software by providing a real measurement of the dose at different points on the patient; and
  to make more precise the mapping of the dose measured at x points (interpolation of the measurement points).

First Alternative Solution

When the installation allows the data relating to the dose deposited during the interventional procedure to be available in real time, the computer program can initially model the patient's skin by extracting the patient's external boundary from the patient's scanner images that were taken before the interventional radiology procedure. This external boundary is then converted into a surface mesh having a predetermined resolution. The computer program then projects each irradiation event described in the DICOM SR file from the interventional radiology device (in real time or delayed relative to the operation) onto the surface of the mesh of the patient's external boundary. The computer program accumulates the different irradiation events per mesh unit, which allows, after mathematical corrections (of the backscatter factor type), to have a differential mapping of the cumulative dose in mGy. As this first mapping is based on the information from the DICOM SRs, it must also be corrected with the actual dose information measured for the different points of interest by the probes 11 to 14 to obtain an absolute dose mapping. This absolute mapping based on the DICOM data from the interventional radiology device, supplemented by spot dose measurements made with the measuring device, is converted into a standard 3D format (example: vtk type) in order to be visualized.

The history of the results obtained for each patient is recorded in a database associated with the measuring equipment.

The results of the processings are displayed on a remote screen and exploited by an alert system. Given the recommendations and regulations in force, the system includes an alert system when the maximum skin dose of 2 Gy is exceeded, and then every subsequent 0.5 Gy.

Second Alternative Solution

When the installation does not provide data on the dose deposited during the interventional procedure in real time, an indicative map of the doses actually measured for the various points of interest by the probes 11 to 14 extrapolated by the barycenter method may be displayed during the operation and extrapolated by one of the techniques described above for greater precision at the end of the examination.

Third Alternative Solution

Also when the installation does not provide the dose data deposited during the interventional procedure in real time, the software for calculating the dose distribution determines the dose distribution from Gafchromic® films and at least one dose measurement for at least one point of interest located on the Gafchromic® film by at least one probe, the combination of these two measuring methods makes it possible to avoid having to calibrate the film batches.

Calibration Method

The solution as proposed above measures a dose and a dose rate deposited in the probe. Depending on the positioning of the probe, this is equivalent to a skin dose measurement. For example, a skin dose can be measured at the back or the pelvis for cardiac procedures, uterine embolizations, renal angioplasty, etc. and a skin dose measurement at the skull for neuroradiology procedures (treatment of arteriovenous cerebral malformations (AVM), intracranial aneurysms, etc.).

The system is calibrated against a reference ionization chamber in terms of air kerma. The result obtained with the ionization chamber is given in mGy. The system calibration factor is therefore given in mGy/TC (TC=Count Rate). It can also be calibrated against a dosimeter such as TLD or Gafchromic®.

In the case of a multipoint probe, each channel will be calibrated independently of the others. A calibration factor will then be defined for each channel.

In the case of a multi-anode PMT photodetector, the cross-talk effect must be taken into account, either from the manufacturer's data or by in-house measurements.

Dose Interpolation

For each detection point $S_i$ a series of measurements $IS_i(t)$, with t indicating the time of the data acquisition are obtained from the data provided by the probes 11 to 14 and processed by the electronic circuit 3 and the computer 4. Such data is converted into values $DS_i(t)$ corresponding to the radiation dose applied to each of the zones Z associated with a probe $S_i$, according to a calibration table. These variables are recorded in a database to apply in real time a processing to calculate doses at points that have not been acquired by a probe 11 to 14, and thus define a high-resolution cartographic representation of the doses received by the patient.

The computer uses the variables recorded in the database to perform a spatial interpolation calculation of at least one estimated irradiation level value $IS_{i,v}(t)$ of at least one virtual area $Z_{i,v}$ not associated with a probe and record values $DS_v(t)$ corresponding to the estimated radiation dose in an area without a probe 11 to 14.

The invention claimed is:

1. A method for measuring and representing, in real time, a level of local irradiation doses in at least two dimensions, comprising:
    positioning N probes $S_i$, sensitive to irradiating radiation, each corresponding to a local zone $Z_i$ according to a known topology;
    acquiring, by each of the probes, a level of irradiation $IS_i$ detected, and periodically recording numerical values $IS_i(t)$; and
    converting the numerical values $IS_i(t)$ into values $DS_i(t)$ corresponding to a radiation dose applied to each local zone $Z_i$ associated with a probe $S_i$, according to a calibration table; and
    performing a spatial interpolation calculation of at least one estimated irradiation level value $IS_{i,v}(t)$ of at least one virtual zone $Z_{i,v}$ that is not associated with a probe.

2. The method of claim 1, further comprising calculating at least one estimated irradiation level value $IS_{i,v}(t)$ using a time interpolation function.

3. The method of claim 2, wherein performing the spatial interpolation calculation comprises applying a calculation processing taking into account a representation of human morphology.

4. The method of claim 3, wherein performing the spatial interpolation calculation comprises applying a calculation processing taking into account a representation of human morphology.

5. The method of claim 4, wherein performing the spatial interpolation calculation comprises applying a calculation processing taking into account a relative position P(t) of a source of the probes and/or of a patient.

6. The method of claim 5, wherein performing the spatial interpolation calculation comprises applying a calculation process taking into account characteristics C(t) of the system delivering the irradiation doses.

7. The method of claim 6, wherein performing the spatial interpolation calculation comprises applying a calculation processing taking into account results obtained with other detectors or patient dose evaluation systems used in clinical routine to estimate the doses received by the patient in one or more dimension(s).

8. The method of claim 1, wherein performing the spatial interpolation calculation comprises applying a calculation processing taking into account a representation of human morphology.

9. The method of claim 8, wherein the human morphology is a generic human morphology.

10. The method of claim 8, wherein the human morphology is a morphology of a human patient subjected to the irradiation.

11. The method of claim 1, wherein performing the spatial interpolation calculation comprises applying a calculation processing taking into account a relative position P(t) of a source of the probes and/or of a patient.

12. The method of claim 1, wherein performing the spatial interpolation calculation comprises applying a calculation process taking into account characteristics C(t) of the system delivering the irradiation doses.

13. The method of claim 1, wherein performing the spatial interpolation calculation comprises applying a calculation processing taking into account results obtained with other detectors or patient dose evaluation systems used in clinical routine to estimate the doses received by the patient in one or more dimension(s).

14. A system for measuring and representing, in real time, local irradiation doses in at least two dimensions, comprising a plurality of radiation-sensitive probes $S_i$ and a computer controlled by a microprocessor and at least one non-transitory computer-readable storage medium storing instructions thereon that, when executed by the at least one microprocessor, cause the system to:
  acquire, by each probe of the plurality of probes, a level of irradiation $IS_i$ detected, and periodically record numerical values $IS_i(t)$; and
  convert the numerical values $IS_i(t)$ into values $DS_i(t)$ corresponding to a radiation dose applied to zones Z respectively associated with the plurality of probes, according to a calibration table; and
  perform a spatial interpolation calculation of at least one estimated irradiation level value $IS_{i_v}(t)$ of at least one virtual zone $Z_{i_v}$ that is not associated with a probe.

15. The system of claim 14, wherein at least a some of the plurality of probes are respectively associated with radiopaque markers.

16. The system of claim 15, wherein each of the radiopaque markers has a distinctive identifier.

17. The system of claim 14, wherein the plurality of radiation-sensitive probes $S_i$ are arranged according to a predetermined topology on a three-dimensional support adapted to a morphology of a target to be irradiated.

18. The system of claim 17, wherein the target is human.

19. The system of claim 17, wherein the target is not human.

* * * * *